Nov. 11, 1930.    H. STELZNER    1,781,254
GAS PROTECTIVE OR BREATHING FILTER
Filed Feb. 4, 1929    2 Sheets-Sheet 1
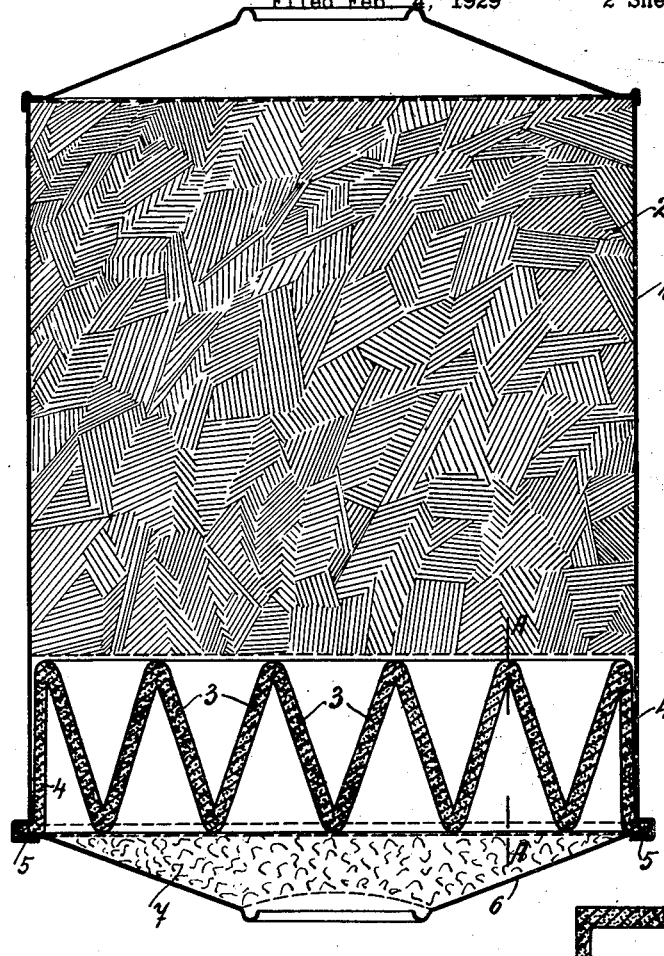
Fig.1.
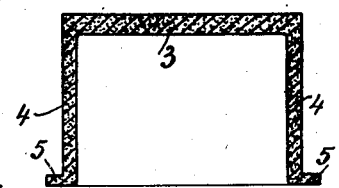
Fig.2.(A-A)
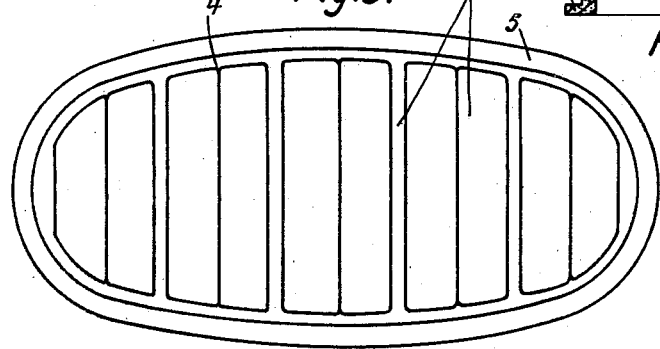
Fig.3.
Inventor
Hermann Stelzner
By
Conway
Attorney Nov. 11, 1930.  H. STELZNER  1,781,254
GAS PROTECTIVE OR BREATHING FILTER
Filed Feb. 4, 1929   2 Sheets-Sheet 2
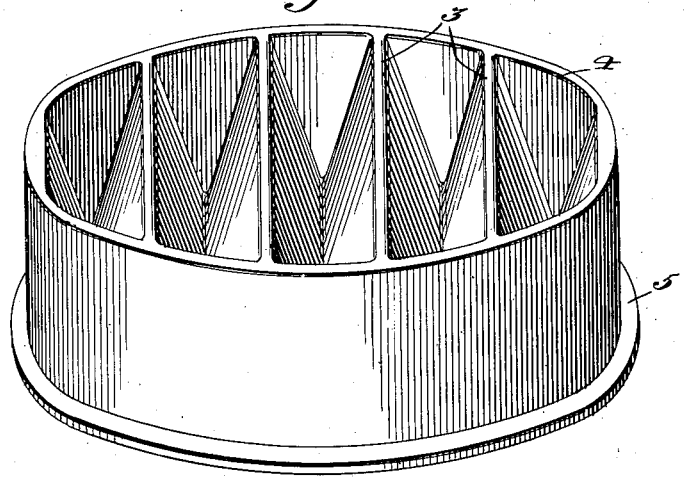
Fig. 4.
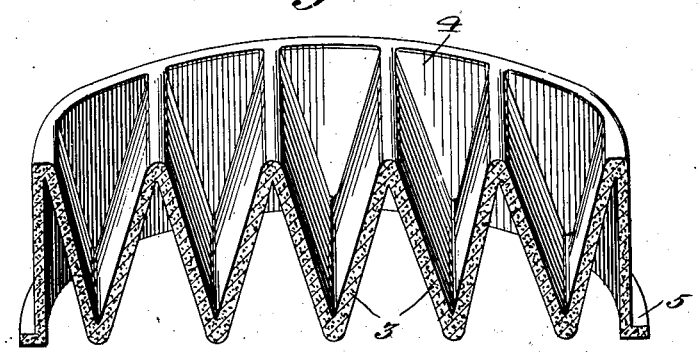
Fig. 5.
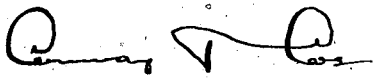
Inventor:
Hermann Stelzner,
Att'y.

Patented Nov. 11, 1930

1,781,254

UNITED STATES PATENT OFFICE

HERMANN STELZNER, OF LUBECK, GERMANY, ASSIGNOR TO OTTO HEINRICH DRÄGER, OF LUBECK, GERMANY

GAS PROTECTIVE OR BREATHING FILTER

Application filed February 4, 1929, Serial No. 337,419, and in Germany February 9, 1928.

The invention relates to a gas-protective- or breathing-filter, in which a vapor filter layer, which is undulated or corrugated or folded or otherwise increased with regard to its superficial area, is disposed transversely to the direction of the current of the breathing air. In the known gas- or vapor-filters of this kind the vapor-filter-layer consists of a mantle provided with numerous perforations or is made of a strong metal netting, which is covered by a fine wire-cloth or gauze and by a filter-cloth and disposed in the direction of the center line within the filter casing and penetrated by the breathing air transversely to the centerline, the air entering one end of the cartridge casing on its periphery and escapes at the same end by a pipe connected to the center of the cartridge.

In comparison to such known filters, the filter constructed according to the present invention is essentially simplified and improved by the fact, that in the filter casing, through which the breathing air passes in the direction of its longitudinal axis, a vapor-filter-layer is inserted which is disposed substantially at right angles to said longitudinal axis and which fills up the cross-sectional area of the casing fully, while the superficial area of the said vapor-filter-layer, which may consist of a uniform, formable, finely porous filter mass, exceeds the said cross-sectional area of the casing. The filter mass may be given the shape of a zigzag-like undulated or folded sheet or band, which is surrounded by a mantle snugly fitting the inner wall of the filter casing and closing the spaces formed by the corrugations or the folds at their ends. This mantle may be given a flange-like turned-up edge or the like serving to form a joint with the filter casing.

In the drawing a filter cartridge is shown constructed according to the invention.

Fig. 1 is a vertical section through the cartridge casing, which comprises a filter mass, in addition to a vapor-filter.

Fig. 2 is a section drawn through the line A—A of Fig. 1.

Fig. 3 is a plan of the body forming the vapor filter.

Fig. 4 is a perspective view of the body forming the vapor-filter.

Fig. 5 is a cross-section of the device shown in Fig. 4.

One part of the filter casing 1 is filled up by a filter mass 2, which may consist of a coarse material serving for absorbing poisonous materials, and at the lower end of the cartridge a body is mounted serving as a vapor filter and consisting of a zigzag-like undulated or folded band or sheet 3 of paper pulp, or fibres, or clay, or ceramic material. In the construction shown, the cartridge casing has an elliptical cross-section, and therefore the said band 3 is broader in the center than at its ends, so that when turned into the zigzag-shape, as shown, it approaches or corresponds to the inside cross-section of the cartridge casing 1. The outer edge of the thus formed body is completely surrounded by a continuous mantle 4, snugly fitting the inside wall of the cartridge casing 1. The transverse triangular spaces or channels formed by the corrugations or folds are closed at their ends by the said mantle, that is, the mantle surrounds the lateral edges of the corrugated portion the lower edge of said mantle being bent to form a flange 5, which may be clamped between the edge of the cartridge casing and its bottom or cover 6 to form a tight joint. Preferably, the zigzag-shaped band 3, the mantle 4 and the flange-like edge 5 are integral to form a unit and may be manufactured by casting or otherwise shaping the filter material. The breathing air passes through the cartridge from bottom to top. The cover 7 may contain a coarse material of wadding or the like, to retain coarse nebulous parts or vapors, dust and the like.

I claim:—

1. A gas protective filter comprising a casing through which the breathing air flows, and a vapor-filter-layer arranged in said casing transversely to the direction of flow of the breathing air, said vapor-filter-layer fully filling the cross-sectional area of said casing and consisting of a corrugated portion of uniform, readily formable filter material having fine pores, and a mantle snugly fitting the inside of said filter casing and completely surrounding the lateral edges of said corrugated portion.

2. A gas protective filter comprising a casing through which the breathing air flows, and a vapor-filter-layer arranged in said casing transversely to the direction of flow of the breathing air, the central portion of said vapor-filter-layer being corrugated to form channels of triangular cross-section, said vapor-filter-layer fully filling the cross-sectional area of said casing and consisting of uniform, formable filter material having fine pores, the said vapor-filter-layer being provided with a mantle snugly fitting the inside of said filter casing and completely surrounding said central portion of the vapor-filter-layer thereby closing the ends of said channels of triangular cross-section, said mantle having a flange for securing it to said casing, the mantle and central corrugated portion of the vapor-filter-layer being integral.

In testimony whereof I have signed my name to this specification.

HERMANN STELZNER.